(12) United States Patent
Morrish

(10) Patent No.: US 8,300,373 B2
(45) Date of Patent: Oct. 30, 2012

(54) VOLTAGE TRIGGERED TRANSIENT BLOCKING UNIT

(75) Inventor: Andrew J. Morrish, Saratoga, CA (US)

(73) Assignee: Bourns, Inc., Riverside, CA (US)

( * ) Notice: Subject to any disclaimer, the term of this patent is extended or adjusted under 35 U.S.C. 154(b) by 0 days.

(21) Appl. No.: 12/456,882

(22) Filed: Jun. 23, 2009

(65) Prior Publication Data
US 2009/0323243 A1 Dec. 31, 2009

Related U.S. Application Data

(60) Provisional application No. 61/133,400, filed on Jun. 26, 2008.

(51) Int. Cl.
*H02H 3/20* (2006.01)
*H02H 9/04* (2006.01)
*H02H 3/08* (2006.01)
*H02H 9/02* (2006.01)

(52) U.S. Cl. ........... 361/91.1; 361/93.1; 361/93.9

(58) Field of Classification Search ........... 361/93.1, 361/93.9
See application file for complete search history.

(56) References Cited

U.S. PATENT DOCUMENTS

| | | | |
|---|---|---|---|
| 3,916,220 A | 10/1975 | Roveti | |
| 4,533,970 A | 8/1985 | Brown | |
| 4,536,699 A * | 8/1985 | Baker | 323/276 |
| 4,847,720 A * | 7/1989 | Dezonno | 361/18 |
| 5,657,195 A | 8/1997 | Rault | |
| 5,742,463 A | 4/1998 | Harris | |
| 7,324,315 B2 | 1/2008 | Harris | |
| 7,342,433 B2 | 3/2008 | Harris | |
| 7,453,268 B2 * | 11/2008 | Lin | 324/608 |
| 7,714,553 B2 * | 5/2010 | Lou | 323/276 |
| 2004/0090726 A1 | 5/2004 | Ball | 361/93.9 |
| 2006/0285264 A1 * | 12/2006 | Harris | 361/58 |
| 2008/0192394 A1 * | 8/2008 | Harris | 361/56 |

* cited by examiner

*Primary Examiner* — Dharti Patel

(74) *Attorney, Agent, or Firm* — Lumen Patent Firm

(57) ABSTRACT

A transient blocking unit (TBU) is an arrangement of two or more transistors connected to each other in series such that they automatically switch off when a TBU current passing through these transistors exceeds a predetermined threshold. Voltage turnoff capability is provided for a TBU by adding a voltage comparison circuit to the TBU. The voltage comparison circuit provides gate voltages to one or more of the TBU transistors that tend to turn off the TBU transistors, if the voltage at the TBU output (i.e., the protected device output voltage) falls outside a predetermined range. The voltage provided by the voltage comparison circuit adds constructively to the gate voltages provided by normal TBU operation. Accordingly, TBU switch off can be driven by an over-current condition (TBU current out of range) and/or by an over-voltage condition (TBU output voltage out of range).

4 Claims, 10 Drawing Sheets

US 8,300,373 B2

VOLTAGE TRIGGERED TRANSIENT BLOCKING UNIT

CROSS REFERENCE TO RELATED APPLICATIONS

This application claims the benefit of U.S. provisional patent application No. 61/133,400, filed on Jun. 26, 2008, entitled "Voltage Triggered Transient Blocking Unit", and hereby incorporated by reference in its entirety.

FIELD OF THE INVENTION

This invention relates to protection of electrical loads from electrical transients.

BACKGROUND

A transient blocking unit (TBU) is an arrangement of two or more transistors connected to each other in series such that they automatically switch off when a TBU current passing through these transistors exceeds a predetermined threshold. As the TBU current increases, voltage drops across the TBU transistors are provided as gate voltages to the TBU transistors that tend to turn these transistors off. When the TBU current is below threshold, this turning-off effect is negligible, and the TBU resistance is low. When the TBU current goes above threshold, the turning-off effect is strong enough to cause positive feedback, which leads to rapid and automatic switching of the TBU to a high-resistance off state. The positive feedback in this situation arises from the tendency of an increasing gate voltage on a TBU transistor to increase the voltage drop across that TBU transistor, and this increased voltage drop is provided as a gate voltage to another TBU transistor. The TBU circuit connections are such that positive feedback can result from these increasing transistor and gate voltages.

FIG. 1 shows a simple example of a conventional TBU. In this example, two depletion mode (i.e., normally-on) transistors, Q1 and Q3, are connected in series such that the same current $I_{TBU}$ flows through Q1 and Q3. As $I_{TBU}$ increases, $V_{DS}$ of Q1 and $V_{SD}$ of Q3 both increase. The transistor types are selected such that as $V_{DS}$ of Q1 increases, the voltage applied to the gate of Q3 acts to shut off Q3. Similarly, as $V_{SD}$ of Q3 increases, the voltage applied to the gate of Q1 acts to shut off Q1. The positive feedback inherent in this arrangement leads to a rapid transition of the TBU from a normal low-impedance state to a high-impedance current blocking state once $I_{TBU}$ exceeds a predetermined threshold. In operation, a TBU can switch to its high-impedance state in response to an over-current condition from an electrical transient, thereby protecting electrical devices or circuits connected to the TBU.

The TBU example of FIG. 1 is a unipolar (or uni-directional) TBU because it is only effective to block surges having a predetermined polarity (i.e., either positive surges or negative surges). FIG. 2 shows a conventional bipolar TBU. The circuit of FIG. 2 can be understood as providing two unipolar TBUs having opposite polarity in series. The first unipolar TBU is formed by the combination of Q1 and Q3, and the second unipolar TBU is formed by the combination of Q2 and Q3. FIG. 2 also shows a typical application for a TBU, where it is placed in series between an electrical device 202 and a load 204 in order to protect device 202 from transients from load 204. Protection of device 202 is also provided from transients that may develop between the TBU and load 204 (e.g., on a transmission line). If a transient from the load causes the TBU current to exceed the TBU threshold, the TBU will switch to its off state, thereby protecting the device from the transient. Some early examples of TBUs include U.S. Pat. No. 3,916,220, U.S. Pat. No. 4,533,970, and U.S. Pat. No. 5,742,463.

However, in some applications, the requirement for the TBU current to reach its threshold before the TBU turns off may pose a problem. For example, the protected device may not be able to sink the TBU threshold current. Although one would ordinarily match the TBU to its protected device such that the protected device can sink the TBU threshold current, the protected device may have multiple modes, each mode having a different current handling capacity. For example, the protected device could have a normal operating mode, where it can sink the TBU threshold current, and it could also have a standby or sleep mode, where it cannot sink the TBU threshold current. In this example, if a load transient occurs while the protected device is in its standby mode, an undesirable over-voltage situation could occur at the protected device, because the TBU is not able to switch to its high impedance state.

Accordingly, it would be an advance in the art to provide a transient blocking unit capable of switching off in some situations where the TBU current is below threshold.

SUMMARY

This problem is addressed in embodiments of the present invention by adding a voltage comparison circuit to the TBU. The voltage comparison circuit provides gate voltages to one or more of the TBU transistors that tend to turn off the TBU transistors, if the voltage at the TBU output (i.e., the protected device output voltage) falls outside a predetermined range. The voltage provided by the voltage comparison circuit adds constructively to the gate voltages provided by normal TBU operation. Accordingly, TBU switch off can be driven by an over-current condition (TBU current out of range) and/or by an over-voltage condition (TBU output voltage out of range). In this manner, TBU switch off can be provided even for protected devices which cannot sink the TBU threshold current. This advantageously provides for protection of a broader class of electrical devices than can be protected with a conventional TBU.

DETAILED DESCRIPTION

Figure 1:
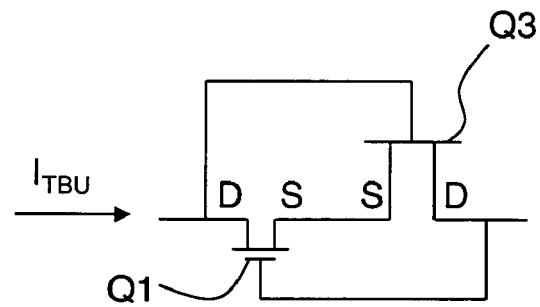
FIG. 1 is a schematic of a prior art transient blocking unit.
Figure 2:
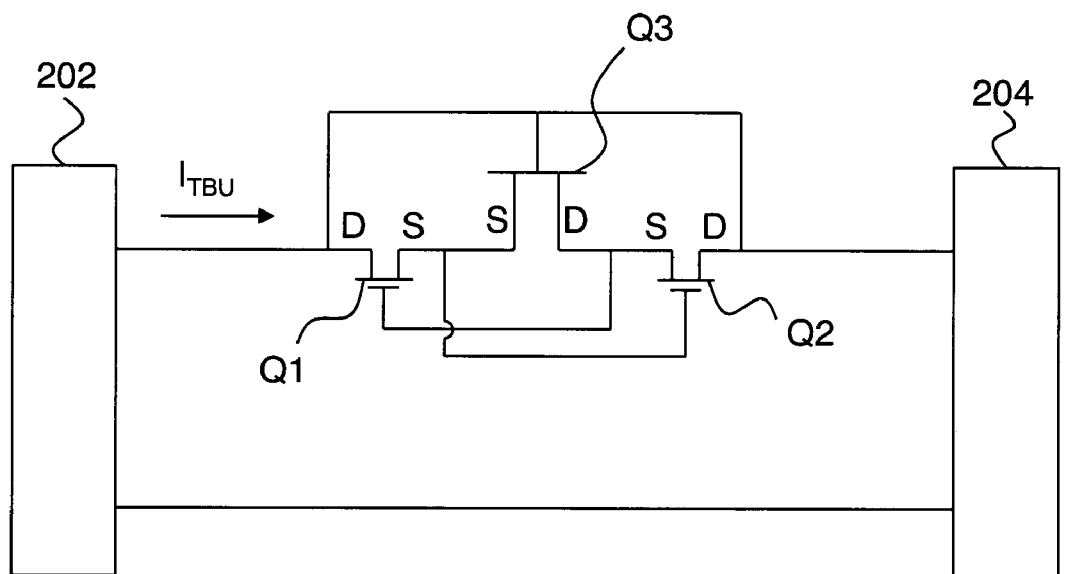
FIG. 2 is another schematic of a prior art transient blocking unit.
Figure 3:
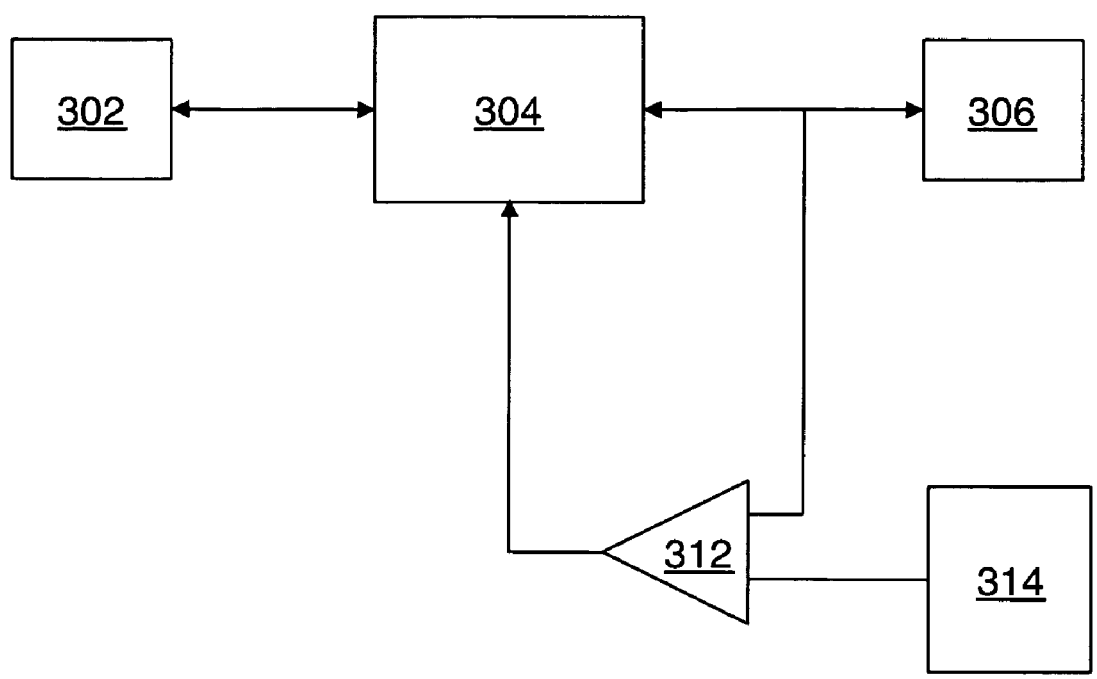
FIG. 3 shows a block diagram relating to embodiments of the invention.

FIG. 3 shows a block diagram relating to embodiments of the invention. A transient blocking unit 304 is connected in series between an electrical device 302 and an electrical load 306. TBU 304 functions as described above to isolate device 302 from load 306 if the TBU current exceeds the threshold. A voltage comparison circuit 312 provides gate voltages to one or more of the TBU transistors of TBU 304 that tend to turn off the TBU transistors, if an output voltage of the TBU (i.e., the voltage at the node between TBU 304 and load 306) falls outside a predetermined range, such as may occur if an electrical fault interferes with the connection between the TBU 304 output and the load 306. Such faults may include lightning strikes, or cross connection to high voltage power lines for example. Accordingly, this TBU output voltage is shown as an input to voltage comparison circuit 312. At least one reference voltage 314 is also provided as an input to comparison circuit 312. In practice, it is often possible to obtain a suitable reference voltage from another part of the circuit (e.g., a ground, a positive voltage supply node, or a negative voltage supply node), thereby avoiding any need for a separate circuit to provide a reference voltage.

In one typical TBU application, protected device 302 is a modem which is in bi-directional communication with load 306. For example, load 306 could be a remotely located second modem, and a transmission line between device 302 and load 306 can be a source of electrical transients. From the point of view of protected device 302, its output voltage is monitored in the circuit of FIG. 3. This is the reason it is convenient to refer to the voltage at the node between TBU 304 and load 306 as a "TBU output voltage".

The voltage(s) provided by voltage comparison circuit 312 adds constructively to the gate voltages provided by normal operation of TBU 304. Accordingly, TBU switch off can be driven by an over-current condition (TBU current out of range) and/or by an over-voltage condition (TBU output voltage out of range). In this manner, TBU switch off can be provided even for loads which cannot sink the TBU threshold current.

Figure 4:
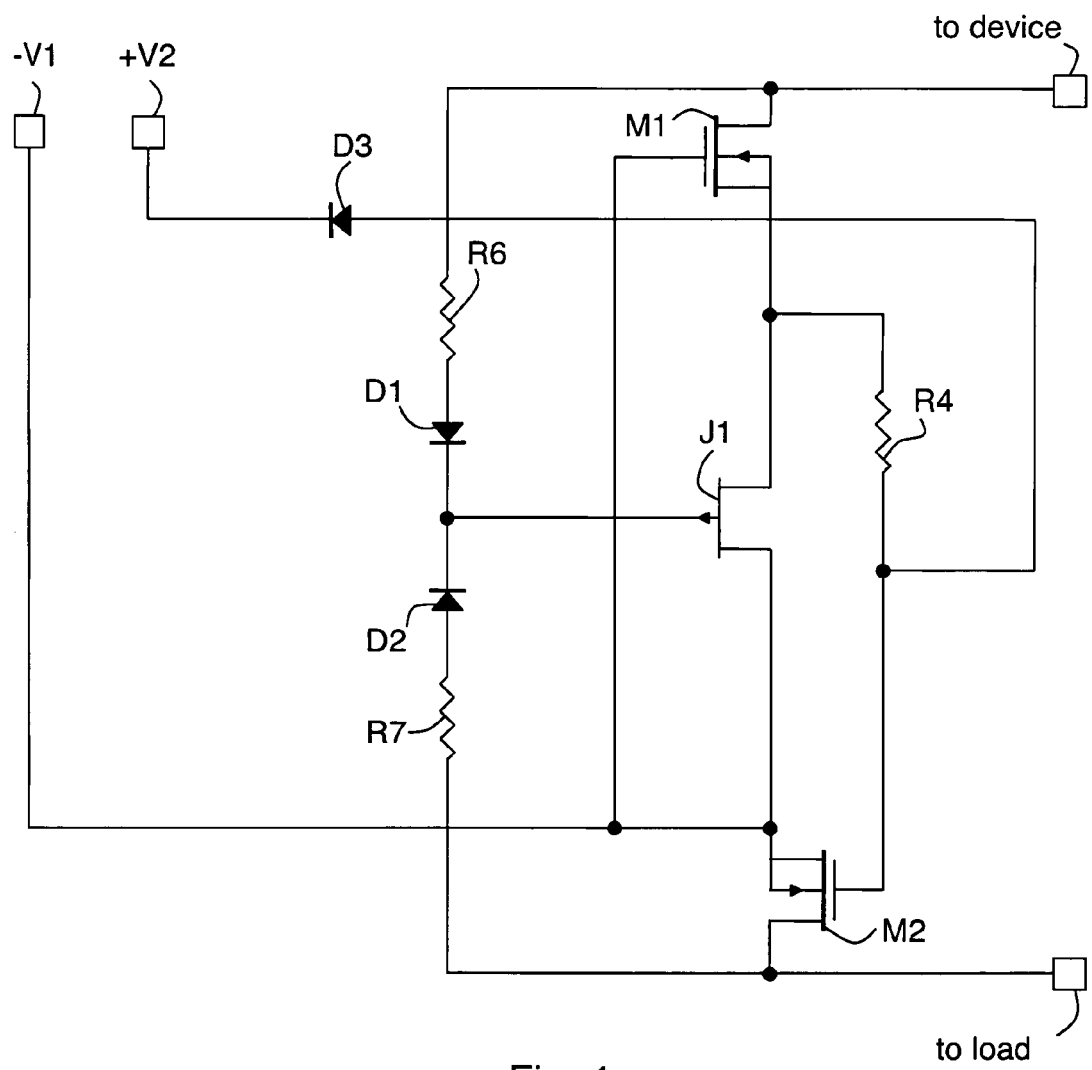
FIG. 4 is a schematic of a first embodiment of the invention.

FIG. 4 is a schematic of a first embodiment of the invention. In this example (and in the examples of FIGS. 5-11), −V1 is the negative voltage supply node, +V2 is the positive voltage supply node, the "to load" terminal is connected to the load (e.g., 306 on FIG. 3), and the "to device" terminal is connected to the electrical device being protected (e.g., 302 on FIG. 3). Transients may arise at the "to load" terminal, and the main purpose of the circuits of FIGS. 5-11 is to block such transients from appearing at the "to device" terminal, while permitting the passage of normal signals between device and load. In this example, a bi-directional TBU is formed by depletion mode transistors M1, J1, and M2 connected in series. The network formed by R6, R7, D1, and D2 ensures proper TBU feedback voltages are present at the gate of J1. Diodes D1 and D2 prevent the resistors from acting as a potential divider, which would decrease the feedback voltage by a factor of 2, thereby decreasing the sensitivity of the TBU.

In the example of FIG. 4, diode D3 in combination with resistor R4 allows the transistor M2 to provide dual functionality and to act as a voltage comparison circuit in addition to its normal purpose in the TBU (like 312 on FIG. 3). More specifically, it causes the TBU to turn off if the TBU output voltage goes above the positive rail (+V2). In that case, if the gate of M2 is pulled above this positive supply rail and D3 is forward biased, it clamps the gate of M2 at 1 diode drop above the rail, and thus will act to turn off M2 if the TBU output voltage is being forced positive by a fault. In this way, the TBU is forced to turn off.

Figure 5:
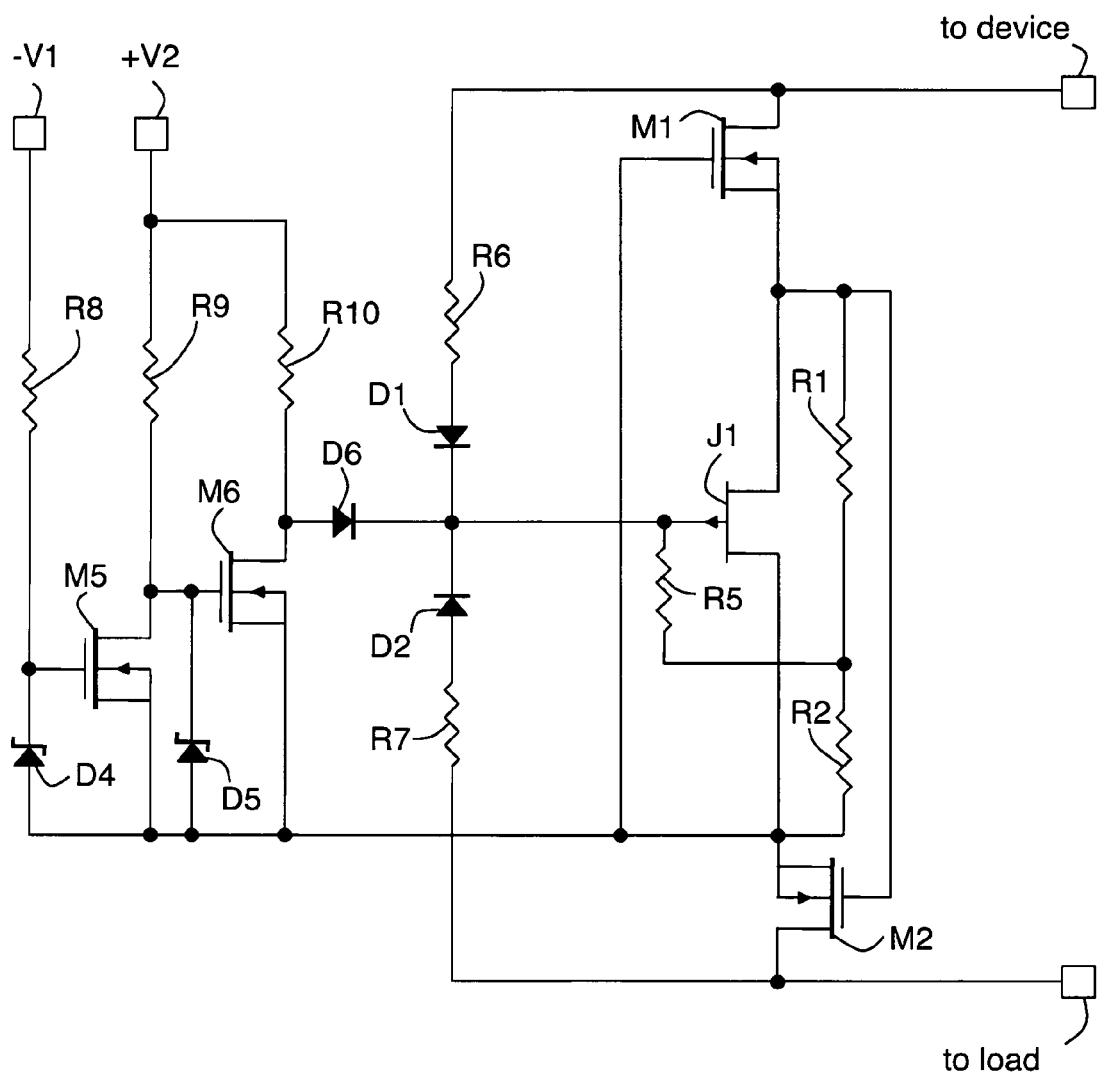
FIG. 5 is a schematic of a second embodiment of the invention.

FIG. 5 is a schematic of a second embodiment of the invention. In this example, a bi-directional TBU is formed by depletion mode transistors M1, J1, and M2 connected in series. The network formed by R6, R7, D1, and D2 ensures proper TBU feedback voltages are present at the gate of J1.

In the example of FIG. 5, enhancement mode MOS transistors M5 and M6 in combination with resistors R1, R2, R5, R8-R10 and diodes D4-D6 act as a voltage comparison circuit (like 312 on FIG. 3). More specifically, it causes the TBU to turn off if the TBU output voltage goes below the negative rail (−V1). When the TBU output voltage drops below a voltage that is $(V_{th}+V_{diode})$ below −V1, the NMOS M5 is turned on, turning off NMOS M6. The rising voltage at the drain of M6 then turns off JFET J1. The threshold voltage $V_{th}$ can be chosen to compensate the diode voltage drop, such that the TBU turns off as the output voltage goes below the threshold voltage of −V1.

Figure 6:
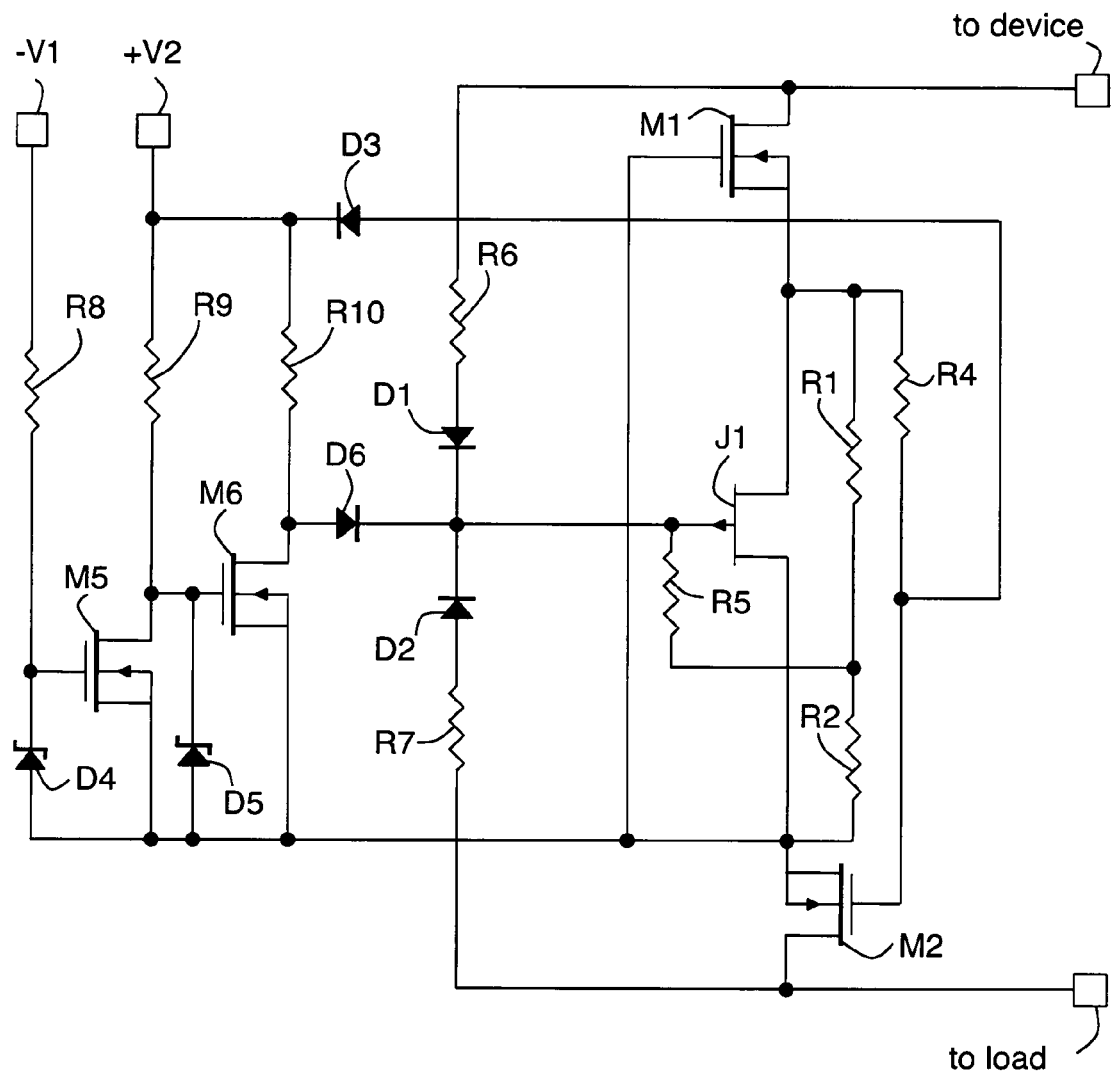
FIG. 6 is a schematic of a third embodiment of the invention.

The ideas of the examples of FIGS. 4 and 5 can be combined. FIG. 6 is a schematic of the resulting third embodiment of the invention. In this circuit, M5 and M6 provide TBU turn-off capability for negative going TBU output voltage faults, while D3 provides TBU turn-off capability for positive going TBU output voltage faults.

The clamp circuit including D3 can be regarded as a first voltage circuit to turn off the TBU when the TBU output voltage exceeds a maximum value of a predetermined voltage range. Similarly, the comparator including transistors M5 and M6 can be regarded as a second voltage circuit to turn off the TBU when the TBU output voltage falls below a minimum value of the predetermined voltage range. As the examples of FIGS. 4-6 indicate, voltage turn-off capability for a TBU can be provided for voltage faults having either or both polarities. In these examples, the diode is used to deal with positive going faults, and a comparator is used to deal with negative going faults.

In some preferred embodiments of the invention, the above-described voltage turn-off capability is provided in combination with an enhancement mode assisted TBU. In this kind of TBU, auxiliary enhancement mode transistors are added to the basic TBU configuration in order to reduce the dependence of the TBU threshold current on poorly controlled parameters of the depletion mode TBU transistors. Further details relating to enhancement mode assisted TBUs can be found in U.S. patent application Ser. No. 12/322,065, filed on Jan. 27, 2009, and hereby incorporated by reference in its entirety.

Figure 7:
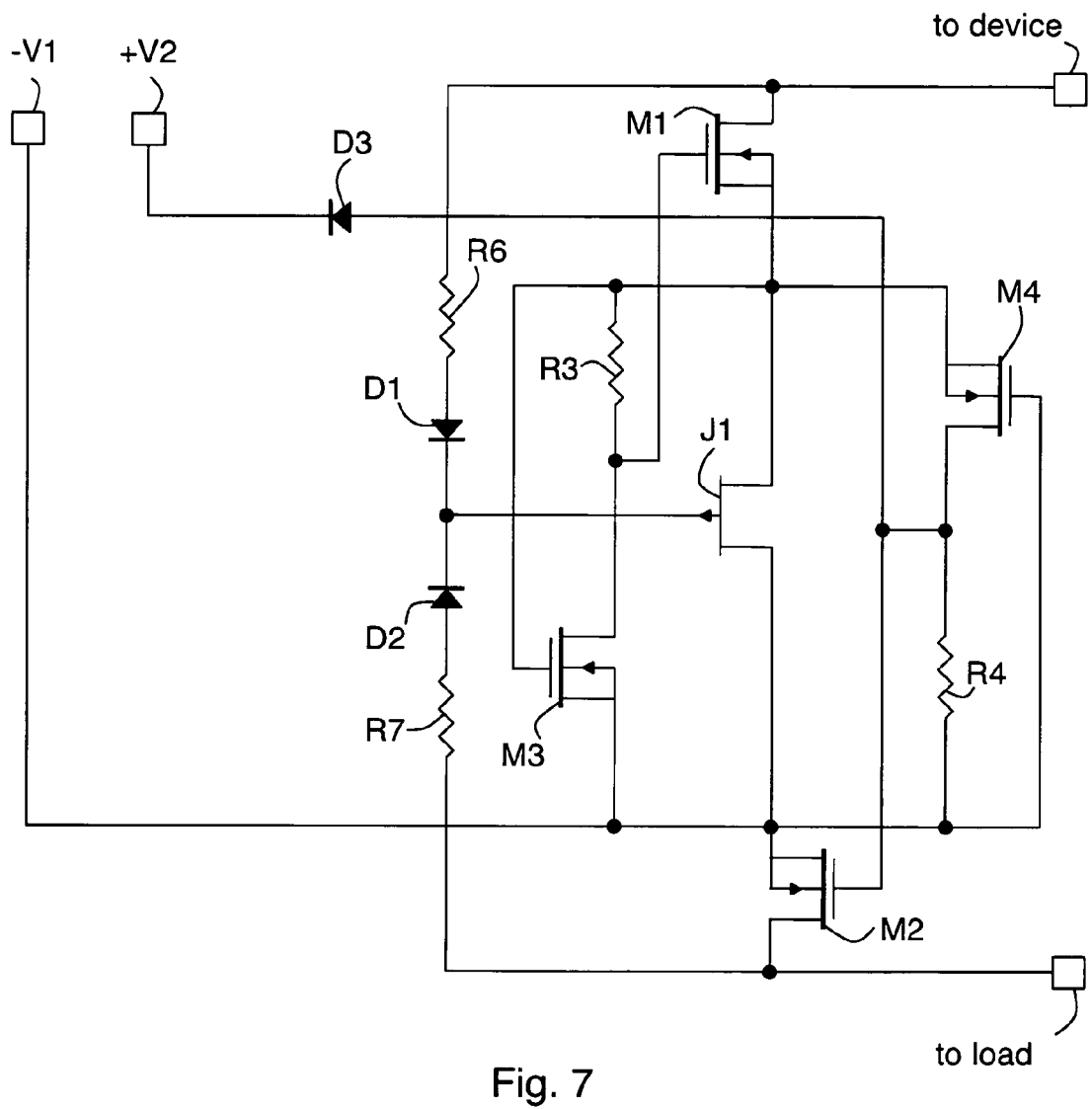
FIG. 7 is a schematic of a fourth embodiment of the invention.

FIG. 7 is a schematic of a fourth embodiment of the invention. In this example, M1, M2, and J1 are the basic depletion mode TBU transistors. Protection against positive going TBU output voltage faults is provided by D3 as described in connection with FIG. 4. Here, M3 and M4 are enhancement mode devices, and are employed to provide gate voltages to M1 and M2 to switch these devices off when the TBU current exceeds threshold.

Figure 8:
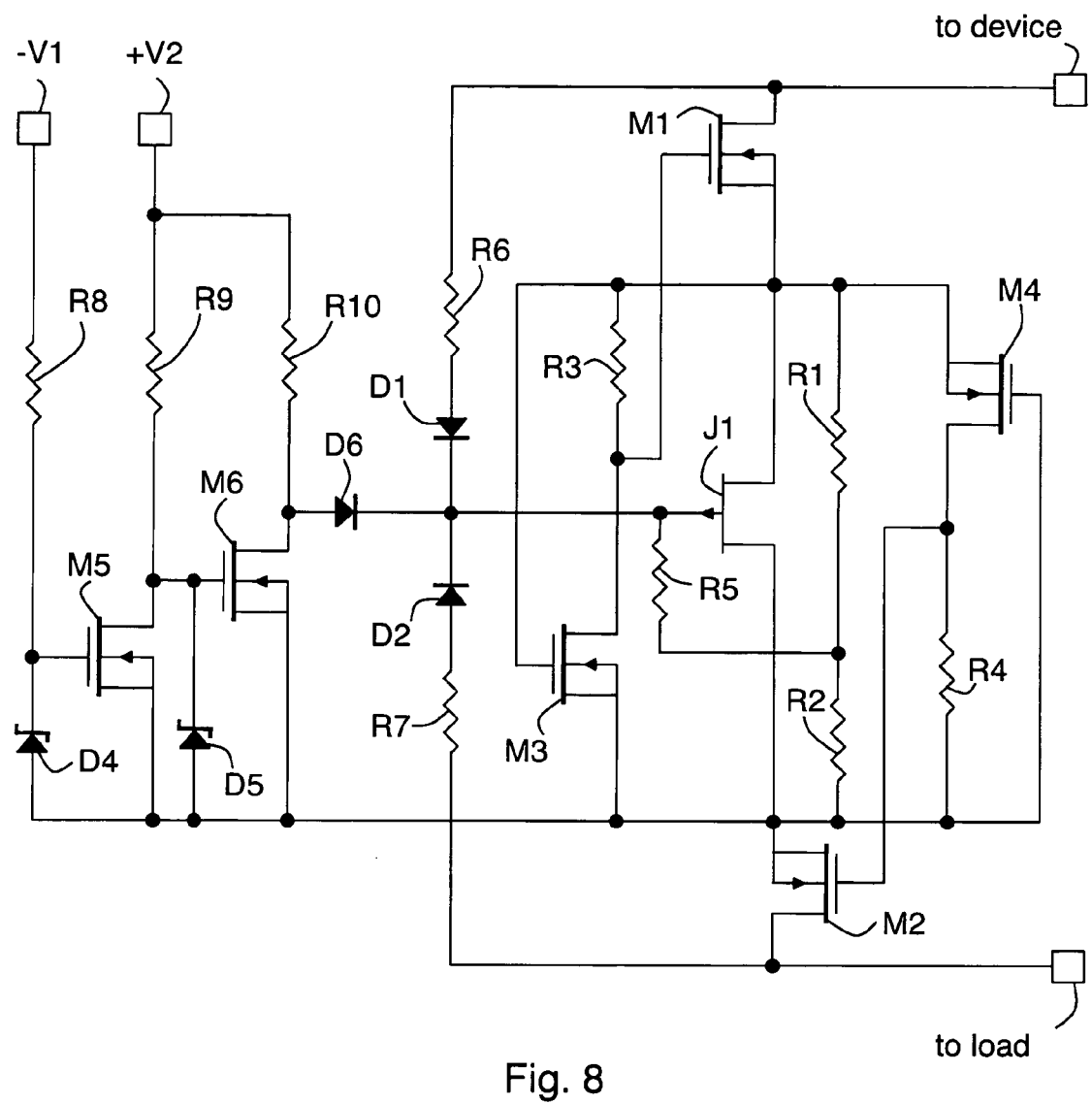
FIG. 8 is a schematic of a fifth embodiment of the invention.

FIG. 8 is a schematic of a fifth embodiment of the invention. This embodiment is similar to the embodiment of FIG. 5, except that enhancement mode devices M3 and M4 are added to provide gate voltages to M1 and M2 to switch these devices off when the TBU current exceeds threshold. Here the comparator provided by M5 and M6 protects against negative going TBU output voltage faults.

Figure 9:
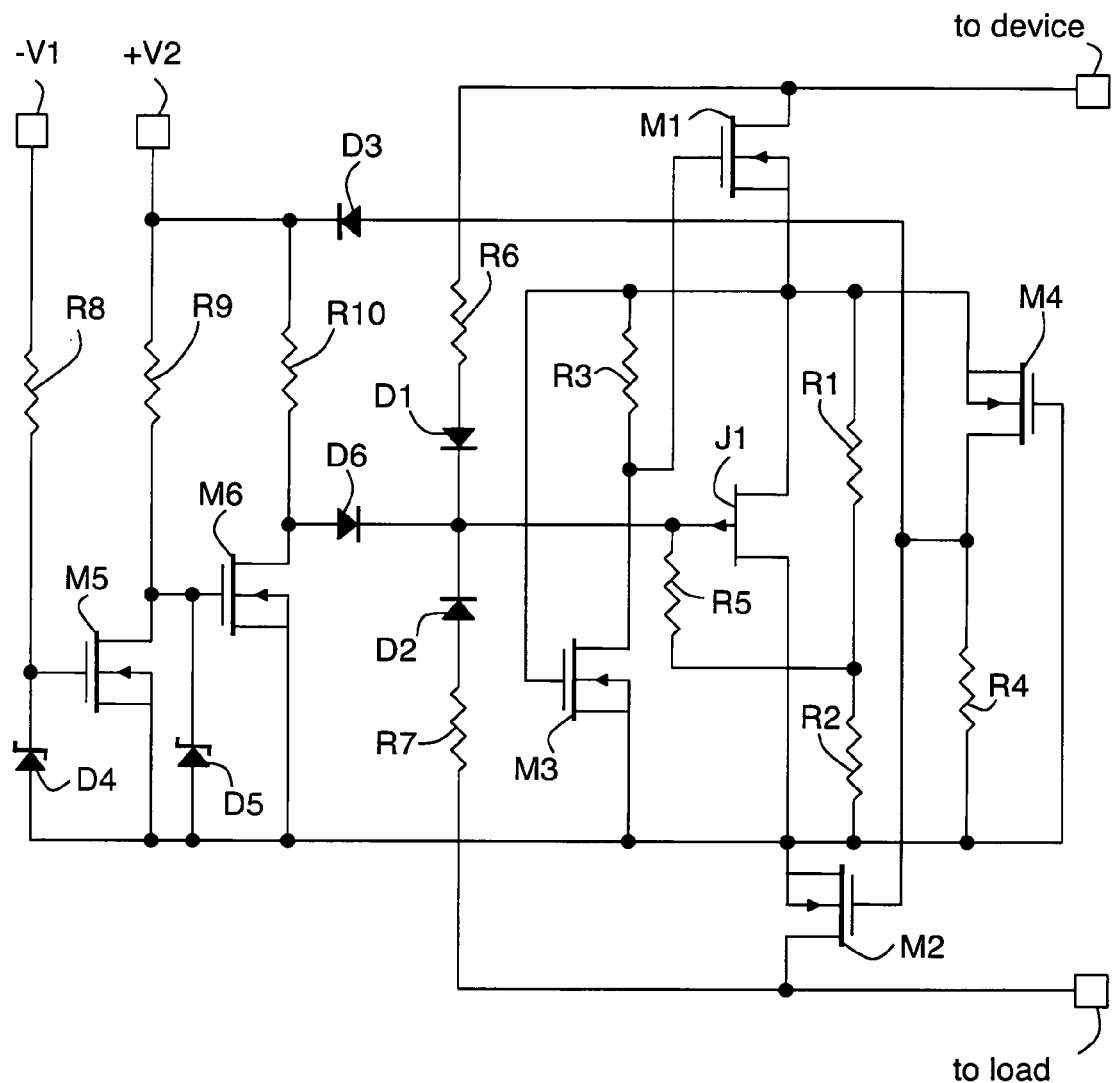
FIG. 9 is a schematic of a sixth embodiment of the invention.

FIG. 9 is a schematic of a sixth embodiment of the invention. This embodiment is similar to the embodiment of FIG. 6, except that enhancement mode devices M3 and M4 are added to provide gate voltages to M1 and M2 to switch these devices off when the TBU current exceeds threshold. Here the comparator provided by M5 and M6 protects against negative going TBU output voltage faults, and the diode clamp including D3 protects against positive going TBU output voltage faults.

In the examples of FIGS. 8-9, it is helpful for integration that transistors M5 and M6 are similar to transistors M3 and M4 (i.e., they can all be low-voltage enhancement mode devices), and that transistors M5, M6, and M3 all share a common substrate connection. However, diode D3 as employed in the examples of FIGS. 4, 6-7, and 9 can pose difficulties for integration because high voltage isolation may be required for this component. Such isolation can be provided in-process, by placing the diode on a separate die, or by providing the diode as an external component, depending on cost and integration goals. However, it remains undesirable to add a component (such as D3) that requires high voltage isolation.

Figure 10:
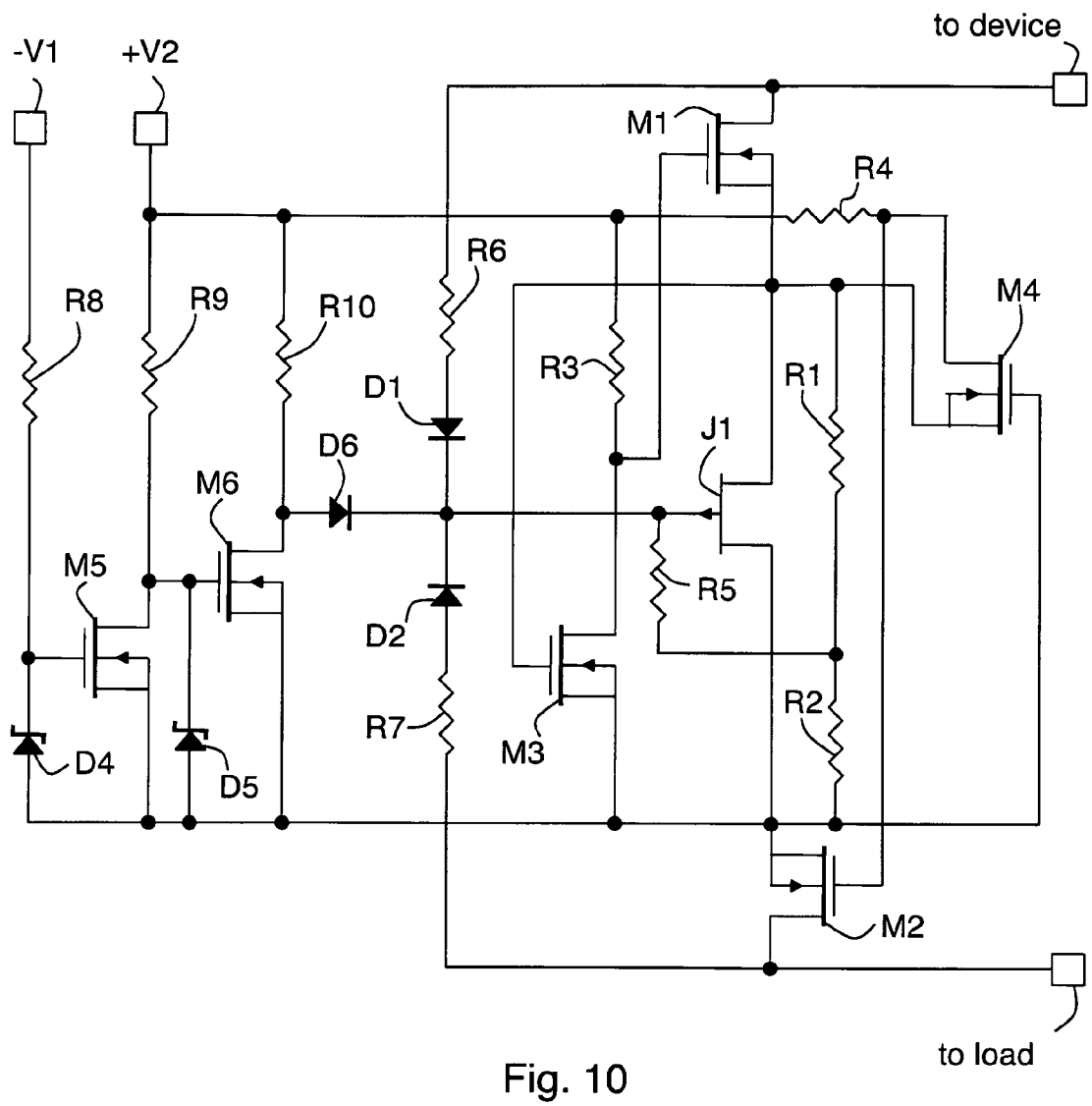
FIG. 10 is a schematic of a seventh embodiment of the invention.

Accordingly, in some presently preferred embodiments of the invention, protection against voltage faults of both polarities is provided with voltage comparison circuits that do not add a component having high isolation requirements to the circuit. FIG. 10 is a schematic of a seventh embodiment of the invention, which follows this design approach.

Figure 11:
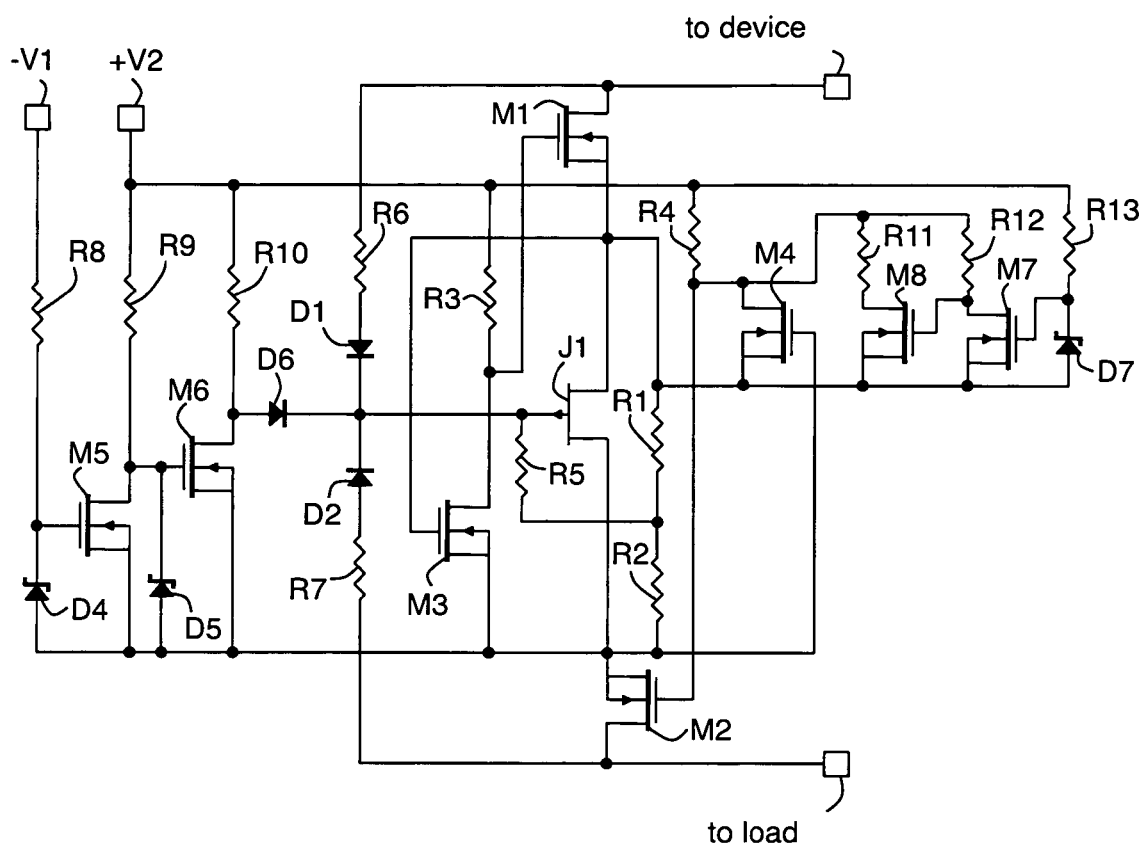
FIG. 11 is a schematic of a eighth embodiment of the invention.

In the circuit of FIG. 10, it is important to note that the basic TBU NMOS transistors M1 and M2 are enhancement mode devices, as opposed to being depletion mode devices as in the previous examples. Transistor J1 on FIGS. 10 and 11 is a depletion mode device, as in the previous examples. As long as M3 and M4 are off (normal TBU on mode), the gates of the two HV NMOS M1 and M2 are pulled high through resistors R3 and R4 respectively, which turns them on. In practice, optional zener clamp diodes (not shown) can be included across the drain-source of M3 and M4 to prevent excessive voltage, or these devices may just be allowed to avalanche, in order to protect the gates of M1 and M2.

Now, if a surge occurs that pulls the TBU output connection to the load positively, if sufficient current flows, then the TBU will act in the normal way of the enhancement mode assisted TBU, in that voltage will be developed across J1 due to the current, which if sufficient, will turn on M4; that in turn will effectively connect (i.e., short) the gate of M2 to the source of M1, which in turn will switch M2 to a high resistance state.

If the device side of the TBU is connected to a high resistance protected device, then insufficient current may flow to trip the TBU. In this case, the TBU device node will also be pulled positive towards the +V2 rail. When the source of M2 approaches +V2, R4 will hold the gate of M2 at +V2, thus causing M2 to turn off, in a similar manner as diode D3 of preceding examples. A high voltage capable resistor can be easily integrated into the controller device, along with the other high voltage resistors, such as R7 and R6. Thus the TBU is turned off by any surge which forces the TBU above the positive rail. In the circuit of FIG. 10, protection against negative going TBU output voltage faults is provided by MS and M6 as described above.

In practice, M2 is usually a fairly large NMOS device and thus has significant gate capacitance. In this case, because of the long RC time constant formed by M2 gate capacitance and R4, the TBU will turn off as a result of relatively slow surges, but may not be fast enough to react to, say 60 Hz mains AC, which is a prime requirement for protection devices. To aid the turn off speed, the circuit of FIG. 10 can be modified by the use of two additional small enhancement mode devices M7 and M8, similar to the MS and M6 devices.

The resulting circuit is shown in the schematic of FIG. 11. Similarly to MS and M6, M7 and M8 act as a comparator. In this circuit, M7 is normally turned fully on, which keeps M8 fully off, and the circuit behaves as described above, with the exception that the voltage at the gate of M2 is now fed from the voltage divider formed by R4 and R12. This voltage divider does not significantly affect circuit operation.

Now when a positive surge occurs, and the TBU load connection approaches the +V2 reference, M7 is turned off as the gate of M7 is tied to +V2 through R13. M7 is a very small device, so its gate capacitance is low. The RC time constant of this gate capacitance and R13 is much lower than the period of 60 Hz AC mains, and hence M7 reacts quickly as the gate drive decreases, and turns off as the TBU load node approaches +V2. When M7 turns off, M8 is turned on, by current through R12, sinking current and discharging any gate charge of NMOS M2 through R11, which is of relatively low value. Hence M8 acts in a similar fashion to M4 and by turning on, it turns off M2. M8 and M4 are wired OR'd into the gate of M2, such that either device can cause M2 to be turned off, either in response to current surges above the TBU threshold, through M4, or in response to voltage surges above the voltage threshold, through M8.

By combining these functions into a single device, it can be seen that both functions of turning off the TBU in response to a voltage surge either above +V2 or below −V1 are achieved by devices M7/8 and M5/6 respectively. The controller circuit is readily integratable on a simple process that allows for simple low voltage NMOS devices and high voltage, high value resistors. In one possible design, the R values of the circuit of FIG. 11 are as follows: R1-2 are 5 k; R3,4,8,9,12,13 are all 5000 k; R5 is 20,000 k; R6,7,10 are 800 k; and R11 is 10 k.

Many variations of the given examples can also be employed in practicing embodiments of the invention. For example, the polarities of devices and voltage inputs can all be consistently reversed. PMOS transistors can be employed in place of NMOS transistors, such as M1 and M2, although NMOS devices are typically preferred because they tend to provide better electrical performance than PMOS devices for TBUs. In such a case of reversed polarities, the V1 and V2 polarities would now also be reversed, such that V2 becomes negative with respect to V1.

One significant aspect of the examples of FIGS. 10 and 11 is the use of enhancement mode devices as some or all of the basic elements of a TBU (i.e., the transistors through which the TBU current flows). This aspect can be generalized, and some embodiments of the invention are TBUs having no voltage triggering capability, but having one or more of the basic TBU depletion mode devices (e.g., M1, M2, J1 of the examples) replaced with enhancement mode devices.

The invention claimed is:

1. A circuit for blocking electrical transients, the circuit comprising:
   a current-protective subcircuit comprising two metal oxide semiconductor (MOS) transistors and a junction field effect transistor (JFET) connected in series such that the JFET is between the MOS transistors, and such that the JFET and the MOS transistors automatically switch to a non-conducting state when a current passing through the current-protective subcircuit between a circuit input and a circuit output exceeds a predetermined current threshold magnitude;
   a first voltage comparison subcircuit connected to a gate of the JFET and capable of providing a gate voltage to the JFET to switch the JFET to a non-conducting state, thereby also switching the MOS transistors to a non-conductive state;
   wherein the first voltage comparison subcircuit has a first input that is connected to the current-protective subcircuit to facilitate measurement of an output voltage at the circuit output and a second input that is connected to a first external voltage source;

wherein the first voltage comparison circuit switches the JFET to a non-conductive state if the output voltage at the circuit output when compared to the first external voltage source falls outside a first predetermined voltage range;

whereby the circuit is capable of blocking transients having a transient current that exceeds the predetermined current threshold magnitude and/or having a transient output voltage outside the first predetermined voltage range.

2. The circuit of claim 1, further comprising:

a second voltage comparison subcircuit connected to a gate of a selected one of the MOS transistors and capable of providing a gate voltage to the selected MOS transistor to switch the selected MOS transistor to a non-conducting state, thereby also switching the other MOS transistor and the JFET to a non-conductive state;

wherein the second voltage comparison subcircuit has a first input that is connected to the current-protective subcircuit to facilitate measurement of the output voltage at the circuit output and a second input that is connected to a second external voltage source;

wherein the second voltage comparison circuit switches the selected MOS transistor to a non-conductive state if the output voltage at the circuit output when compared to the second external voltage source falls outside a second predetermined voltage range.

3. The circuit of claim 1, further comprising: two enhancement mode transistors disposed to provide gate voltages to the MOS transistors of the current-protective subcircuit to switch the MOS transistors off when the current exceeds the predetermined threshold magnitude.

4. The circuit of claim 3, further comprising:

a second voltage comparison subcircuit connected to a gate of a selected one of the MOS transistors and capable of providing a gate voltage to the selected MOS transistor to switch the selected MOS transistor to a non-conducting state, thereby also switching the other MOS transistor and the JFET to a non-conductive state;

wherein the second voltage comparison subcircuit has a first input that is connected to the current-protective subcircuit to facilitate measurement of the output voltage at the circuit output and a second input that is connected to a second external independent voltage source;

wherein the second voltage comparison circuit switches the selected MOS transistor to a non-conductive state if the output voltage at the circuit output when compared to the second external voltage source falls outside a second predetermined voltage range.

\* \* \* \* \*